US011421103B2

(12) United States Patent
Lee et al.

(10) Patent No.: US 11,421,103 B2
(45) Date of Patent: Aug. 23, 2022

(54) METHOD FOR PREPARING GRAFT COPOLYMER POWDER

(71) Applicant: LG CHEM, LTD., Seoul (KR)

(72) Inventors: Jong Ju Lee, Daejeon (KR); Jeong Su Choi, Daejeon (KR); Won Seok Lee, Daejeon (KR); Roo Da Lee, Daejeon (KR); Ho Hoon Kim, Daejeon (KR); Keun Hoon Yoo, Daejeon (KR); Seok Goo Jang, Daejeon (KR); Sang Hoo Park, Daejeon (KR); Hye Jeong Ok, Daejeon (KR); Hyung Seop Shim, Daejeon (KR)

(73) Assignee: LG CHEM, LTD, Seoul (KR)

( * ) Notice: Subject to any disclaimer, the term of this patent is extended or adjusted under 35 U.S.C. 154(b) by 400 days.

(21) Appl. No.: 16/619,435

(22) PCT Filed: Nov. 9, 2018

(86) PCT No.: PCT/KR2018/013629
§ 371 (c)(1),
(2) Date: Dec. 4, 2019

(87) PCT Pub. No.: WO2019/103369
PCT Pub. Date: May 31, 2019

(65) Prior Publication Data
US 2021/0292538 A1  Sep. 23, 2021

(30) Foreign Application Priority Data
Nov. 22, 2017 (KR) .......................... 10-2017-0156566

(51) Int. Cl.
*C08L 51/04* (2006.01)
*C08J 3/12* (2006.01)

(52) U.S. Cl.
CPC .................. *C08L 51/04* (2013.01); *C08J 3/12* (2013.01); *C08J 2351/04* (2013.01); *C08J 2471/02* (2013.01)

(58) Field of Classification Search
CPC ....... C08L 51/04; C08L 71/02; C08J 2351/04; C08J 2471/02
See application file for complete search history.

(56) References Cited

U.S. PATENT DOCUMENTS

| 4,508,876 A * | 4/1985 | Takaki .................. C08F 279/06 525/902 |
| 5,122,300 A * | 6/1992 | Onaka .................. C07C 59/305 252/384 |
| 9,006,330 B2 | 4/2015 | Ahn et al. |
| 2008/0207828 A1 | 8/2008 | Thetford |
| 2012/0175565 A1 | 7/2012 | Lovenich et al. |
| 2013/0345362 A1 | 12/2013 | Maeda et al. |
| 2014/0094556 A1 | 4/2014 | Ahn et al. |
| 2016/0096957 A1 | 4/2016 | Yoo et al. |
| 2016/0137830 A1 * | 5/2016 | Ahn .................. C08L 51/04 525/70 |
| 2016/0222152 A1 | 8/2016 | Han et al. |

FOREIGN PATENT DOCUMENTS

| CN | 1202878 A | 12/1998 |
| CN | 102482403 A | 5/2012 |
| CN | 103443154 A | 12/2013 |
| CN | 104768988 A | 7/2015 |
| CN | 105189588 A | 12/2015 |
| EP | 2093254 A1 | 8/2009 |
| JP | 08120888 A * | 5/1996 |
| JP | H08120888 A | 5/1996 |
| JP | 2008101209 A | 5/2008 |
| KR | 20040039935 A | 5/2004 |
| KR | 20130056507 A | 5/2013 |
| KR | 1020130082429 A | 7/2013 |
| KR | 20140000324 A | 1/2014 |
| KR | 20150004008 A | 1/2015 |
| KR | 20150015899 A | 2/2015 |
| KR | 20150037645 A | 4/2015 |
| KR | 101628580 B1 | 6/2016 |
| KR | 20170071845 A | 6/2017 |
| KR | 20170096805 A | 8/2017 |
| WO | 2014208965 A1 | 12/2014 |
| WO | 2015030415 A1 | 3/2015 |

OTHER PUBLICATIONS

Qing Li, "A synthesis and characterization study of weathering and transparent MBS for PVC impact modifier", Chinese Master's Theses Full-text Database, Engineering Science and Technology I, Nov. 15, 2009.
Search Report dated May 27, 2020 for European Application No. 18880958.6.

* cited by examiner

*Primary Examiner* — Mark S Kaucher

(57) ABSTRACT

The present invention relates to a method for preparing a graft copolymer powder, which includes: performing emulsion polymerization of a conjugated diene polymer, an aromatic vinyl monomer and an alkyl (meth)acrylate monomer to prepare a graft copolymer latex; coagulating the graft copolymer latex; aging the coagulated graft copolymer; preparing a wet powder of the graft copolymer by dehydrating the aged graft copolymer; and adding poly(oxyalkylene) diglycolic acid to the wet powder of the graft copolymer.

12 Claims, No Drawings

METHOD FOR PREPARING GRAFT COPOLYMER POWDER

CROSS-REFERENCE TO RELATED APPLICATION

The present application is a National Stage of International Application No. PCT/KR2018/013629, filed on Nov. 9, 2018 which claims priority to and the benefit of Korean Patent Application No. 10-2017-0156566, filed on Nov. 22, 2017, the disclosure of which is incorporated herein by reference in its entirety.

TECHNICAL FIELD

The present invention relates to a method for preparing a graft copolymer powder, and more particularly, to a method for preparing a graft copolymer powder having an improved anti-caking property.

BACKGROUND ART

Caking of a graft copolymer powder is made by interaction in-between the graft copolymer powder, and refers to solidification of a freely flowing powder. Such caking occurs due to transformation and binding of a powder in various industrial fields such as detergents, foods, fertilizers, pharmaceuticals, and chemicals.

Meanwhile, in WO2015-030415A, a method for preparing a transparent ABS copolymer is disclosed. The transparent ABS copolymer obtained by emulsion polymerization is present as a latex type, and is recovered as a powder through post-treatment processes such as coagulation, dehydration, drying, etc. Here, in the coagulation and dehydration processes, caking of the transparent ABS copolymer powder frequently occurred. The caking not only reduced the efficiency of a process for preparing a graft copolymer, but also caused deformation or failure of production equipment.

For this reason, efforts have been made to prevent caking by investigating various internal factors (cohesive force, elastic force, yield stress, hygroscopicity, particle size, etc.) and external factors (temperature, humidity, strain rate, vibration, etc.), which cause caking.

It has been revealed that process efficiency may be increased by performing the dehydration and drying processes for a transparent ABS copolymer latex at a higher temperature, but due to powder caking, there is a limit to the temperature rise. Therefore, research on preventing powder caking and improving process efficiency has been continued.

DISCLOSURE

Technical Problem

The present invention is directed to providing a method for preparing a graft copolymer powder, which can prevent caking of a graft copolymer powder.

Technical Solution

To attain the above-described object, the present invention provides a method for preparing a graft copolymer powder, which includes: performing emulsion polymerization of a conjugated diene polymer, an aromatic vinyl monomer and an alkyl (meth)acrylate monomer to prepare a graft copolymer latex; coagulating the graft copolymer latex; aging the coagulated graft copolymer; preparing a wet powder of the graft copolymer by dehydrating the aged graft copolymer; and adding poly(oxyalkylene)diglycolic acid to the wet powder of the graft copolymer.

Advantageous Effects

According to a method for preparing a graft copolymer powder of the present invention, caking of a wet powder of the graft copolymer can be prevented by coating the wet powder of the graft copolymer with poly(oxyalkylene)diglycolic acid. As a result, in the preparation of the graft copolymer powder, deformation or failure of production equipment can be minimized.

Modes of the Invention

Hereinafter, to help in understanding of the present invention, the present invention will be described in further detail.

Terms and words used in the specification and claims should not be construed as limited to common or dictionary terms, and should be interpreted with the meaning and concept in accordance with the technical idea of the present invention based on the principle that the inventors have appropriately defined the concepts of terms in order to explain the invention in the best way.

A method for preparing a graft copolymer powder according to an exemplary embodiment of the present invention includes performing emulsion polymerization of a conjugated diene polymer, an aromatic vinyl monomer and an alkyl (meth)acrylate monomer to prepare a graft copolymer latex; coagulating the graft copolymer latex; aging the coagulated graft copolymer; preparing a wet powder of the graft copolymer by dehydrating the aged graft copolymer; and adding poly(oxyalkylene)diglycolic acid to the wet powder of the graft copolymer.

Hereinafter, each step of the method for preparing a graft copolymer powder according to an exemplary embodiment of the present invention will be described in detail.

1. Step of Preparing Graft Copolymer Latex

First, emulsion polymerization of a conjugated diene polymer, an aromatic vinyl monomer, and an alkyl (meth)acrylate monomer is performed.

The conjugated diene polymer is prepared by polymerizing a conjugated diene monomer, and may be present as a latex type in which the conjugated diene polymer is dispersed in water in a colloidal state.

The conjugated diene monomer may be one or more selected from the group consisting of 1,3-butadiene, isoprene, chloroprene and piperylene, and preferably 1,3-butadiene.

The conjugated diene polymer may be prepared by polymerizing the conjugated diene monomer with one or more comonomers selected from the group consisting of an aromatic vinyl monomer and a vinylcyano monomer. In this case, the comonomer may be one or more selected from the group consisting of an aromatic vinyl monomer and a vinylcyano monomer, and particularly, one or more selected from the group consisting of styrene and acrylonitrile.

The conjugated diene polymer may be included at 40 to 70 wt %, 45 to 65 wt % or 50 to 60 wt %, and preferably 50 to 60 wt %, with respect to the total weight of the conjugated diene polymer, the aromatic vinyl monomer and the alkyl (meth)acrylate monomer. When the above-mentioned range is satisfied, the graft copolymer may have superior impact resistance, processability and transparency. In addition, the graft copolymer may have superior polymerization stability.

Here, a content of the conjugated diene polymer may be based on a solid content.

The conjugated diene polymer may have an average particle size of 0.06 to 0.5 μm, 0.08 to 0.45 μm, or 0.08 to 0.32 μm, and preferably 0.1 to 0.3 μm. When the above-mentioned range is satisfied, mechanical properties such as transparency and impact strength may be further improved.

The average particle diameter of the conjugated diene polymer may be measured using dynamic light scattering, and specifically, Nicomp 380 (trade name, manufacturer: PSS). The average particle diameter may refer to an arithmetic average particle diameter, and specifically, a scattering intensity average particle diameter in a grain size distribution measured by dynamic light scattering.

The aromatic vinyl monomer may be one or more selected from the group consisting of styrene, α-methyl styrene and p-methyl styrene, and preferably, styrene.

The aromatic vinyl monomer may be included at 5 to 25 wt %, 8 to 20 wt % or 10 to 15 wt %, and preferably 10 to 15 wt %, with respect to the total weight of the conjugated diene polymer, the aromatic vinyl monomer and the alkyl (meth)acrylate monomer. When the above-mentioned range is satisfied, the graft copolymer, which is the final product, may have superior transparency and processability.

The alkyl (meth)acrylate monomer may be one or more selected from the group consisting of methyl (meth)acrylate, ethyl (meth)acrylate, propyl (meth)acrylate, 2-ethylhexyl (meth)acrylate, decyl (meth)acrylate and lauryl (meth)acrylate, and preferably, methyl (meth)acrylate.

The alkyl (meth)acrylate monomer may be included at 15 to 45 wt %, 20 to 40 wt % or 25 to 35 wt %, and preferably, 25 to 35 wt %, with respect to the total weight of the conjugated diene polymer, the aromatic vinyl monomer and the alkyl (meth)acrylate monomer. When the above-mentioned range is satisfied, the graft copolymer, which is the final product, may have superior transparency and a superior mechanical property.

The emulsion polymerization in the step of preparing the graft copolymer latex may be performed by further including a vinylcyano monomer.

The vinylcyano monomer may be one or more selected from the group consisting of acrylonitrile, methacrylonitrile, phenylacrylonitrile and α-chloroacrylonitrile, and preferably, acrylonitrile.

The vinylcyano monomer may be included at 0.1 to 10 wt %, 0.5 to 5 wt % or 1 to 3 wt %, and preferably, 1 to 3 wt %, with respect to the total weight of the conjugated diene polymer, the aromatic vinyl monomer, the alkyl (meth)acrylate monomer and the vinylcyano monomer. When the above-mentioned range is satisfied, the graft copolymer may be improved in chemical resistance, and yellowing caused by the vinylcyano monomer may be minimized.

The emulsion polymerization may be graft emulsion polymerization, which may be performed at 50 to 85° C. or 60 to 80° C., and preferably 60 to 80° C.

The emulsion polymerization may be performed in the presence of an initiator and an emulsifier.

The initiator is a radical initiator, which may be one or more selected from the group consisting of inorganic peroxides such as sodium persulfate, potassium persulfate, ammonium persulfate, potassium perphosphate, and hydrogen peroxide; organic peroxides such as t-butyl peroxide, cumene hydroperoxide, p-methane hydroperoxide, di-t-butyl peroxide, t-butylcumyl peroxide, acetyl peroxide, isobutyl peroxide, octanonyl peroxide, dibenzoyl peroxide, 3,5,5-trimethylhexanol peroxide and t-butyl peroxyl isobutyrate; and azo compounds such as azobis isobutyronitrile, azobis-2,4-dimethylvaleronitrile, azobis cyclohexanecarbonitrile and methyl azobisisobutylate, and preferably, cumene hydroperoxide.

The initiator may be added at 0.001 to 1.0 part by weight, 0.01 to 0.5 part by weight or 0.02 to 0.1 part by weight, and preferably, 0.02 to 0.1 part by weight with respect to 100 parts by weight of the total weight of the conjugated diene polymer, the aromatic vinyl monomer and the alkyl (meth) acrylate monomer. When the above-mentioned range is satisfied, emulsion polymerization may be easily performed, and the residual amount of the initiator in the graft copolymer powder may be minimized.

To accelerate an initiation reaction with the initiator, an activator may be further added. The activator may be one or more selected from the group consisting of sodium formaldehyde sulfoxylate, sodium ethylenediamine tetraacetate, ferrous sulfate, dextrose, sodium pyrophosphate, sodium pyrophosphate anhydrous and sodium sulfate, and preferably, one or more selected from the group consisting of sodium ethylenediamine tetraacetate, ferrous sulfate and sodium aldehyde sulfoxylate.

The activator may be added at 0.001 to 0.5 part by weight, 0.001 to 0.1 part by weight or 0.001 to 0.08 part by weight, and preferably, 0.001 to 0.08 part by weight, with respect to 100 parts by weight of the total weight of the conjugated diene polymer, the aromatic vinyl monomer, and the alkyl (meth)acrylate monomer. When the above-mentioned range is satisfied, emulsion polymerization may be more easily performed, and the residual amount of the activator in the graft copolymer powder may be minimized.

The emulsifier may be one or more selected from the group consisting of a sodium compound of alkyl benzene sulfonate, a potassium compound of alkyl benzene sulfonate, a potassium compound of an alkyl carboxylate, a sodium compound of an alkyl carboxylate, a potassium compound of oleic acid, a sodium compound of oleic acid, a sodium compound of an alkylsulfate, a potassium compound of an alkylsulfate, a sodium compound of an alkyl dicarboxylate, a potassium compound of an alkyl dicarboxylate, a sodium compound of an alkylethersulfonate, a potassium compound of an alkylethersulfonate, a sodium compound of an alkylethersulfate, a potassium compound of an alkylethersulfate and an ammonium compound of allyloxynonylphenoxypropane-2-yloxymethylsulfate, and preferably, a sodium compound of alkyl benzene sulfonate, which is sodium dodecyl benzene sulfonate.

The emulsifier may be a commercially available material, and in this case, the commercially available material may be one or more selected from the group consisting of SE-10N (ADEKA Corp.), BC-10 (DAI-ICHI KOGYO SEIYAKU Co., Ltd), BC-20 (DAI-ICHI KOGYO SEIYAKU Co., Ltd), HS10 (MITSUBISHI), Hitenol KH10 (DAI-ICHI KOGYO SEIYAKU Co., Ltd) and PD-104 (Kao Chemicals).

The emulsifier may be added at 0.15 to 2.0 parts by weight, 0.3 to 1.5 parts by weight or 0.5 to 1.2 parts by weight, and preferably, 0.5 to 1.2 parts by weight with respect to 100 parts by weight of the total weight of the conjugated diene polymer, the aromatic vinyl monomer and the alkyl (meth)acrylate monomer. When the above-mentioned range is satisfied, emulsion polymerization may be easily performed, and the residual amount of the initiator in the graft copolymer powder may be minimized.

In the emulsion polymerization, a molecular weight modifier may be further added. The molecular weight modifier may be one or more selected from the group consisting of t-dodecyl mercaptan, N-dodecyl mercaptan and an α-methyl styrene dimer, and preferably, t-dodecyl mercaptan.

The molecular weight modifier may be added at 0.1 to 1.0 parts by weight, 0.2 to 0.8 part by weight or 0.4 to 0.6 part by weight, and preferably, 0.4 to 0.6 part by weight, with respect to 100 parts by weight of the total weight of the conjugated diene polymer, the aromatic vinyl monomer and the alkyl (meth)acrylate monomer.

The emulsion polymerization may be performed by batchwise adding monomers to a reactor, partially adding monomers to a reactor before initiation of emulsion polymerization and then continuously adding the other components after the initiation of the emulsion polymerization, or continuously adding monomers for a predetermined period of time.

2. Coagulation Step

Subsequently, the graft copolymer latex is coagulated.

To coagulate the graft copolymer latex, a coagulant may be used, and may be one or more selected from the group consisting of magnesium sulfate ($MgSO_4$), aluminum sulfate, calcium chloride, tartaric acid and citric acid, and preferably, calcium chloride.

The coagulation step may be carried out at 93 to 97° C., 94 to 96° C. or 93 to 95° C., and preferably, at 93 to 95° C. The coagulation step may be carried out for 5 to 20 minutes, 7 to 20 minutes or 10 to 20 minutes, and preferably 10 to 20 minutes. When the above-mentioned range is satisfied, coagulation may be easily performed, and thus non-coagulation may be minimized.

3. Aging Step

Subsequently, the coagulated graft copolymer is aged.

The aging step may be carried out at 50 to 98° C., 80 to 98° C. or 90 to 98° C., and preferably 90 to 98° C. When the above-mentioned range is satisfied, an apparent specific gravity may be increased, and caking may be minimized.

The aging step may be carried out for 20 to 100 minutes, 20 to 60 minutes or 20 to 30 minutes, and preferably 20 to 30 minutes. When the above-mentioned range is satisfied, an apparent specific gravity may be increased, and caking may be minimized.

The method for preparing a graft copolymer powder according to an exemplary embodiment of the present invention may further include washing an aged graft copolymer with water after the aging step. A temperature of the water may be 15 to 20° C., and the aged graft copolymer is washed with water one to three times.

Through the washing step, impurities in the graft copolymer may be considerably reduced.

4. Step of Preparing Wet Powder of Graft Copolymer

Subsequently, a wet powder of the graft copolymer is prepared by dehydrating the aged graft copolymer.

Dehydration of the aged graft copolymer may be performed using a dehydrator, and specifically, a centrifugal dehydrator (trade name: WS-7000, manufacturer: Hanil Electronics).

The dehydration may be performed at room temperature.

A moisture content in the wet powder of the graft copolymer may be 10 to 40%, 15 to 35% or 20 to 30%, and preferably 20 to 30%. When the above-mentioned range is satisfied, caking of the wet powder of the graft copolymer may be minimized.

The moisture content may be measured by the following method.

Moisture content (%)=(weight of wet powder of graft copolymer (g)−weight of dry powder of graft copolymer (g))/(weight of wet powder of graft copolymer (g))×100

Wet powder of the graft copolymer: The aged graft copolymer is dehydrated using a centrifugal dehydrator (Trade Name: WS-7000, Manufacturer: Hanil Electronics) at room temperature for 5 minutes.

Dry powder of the graft copolymer: The wet powder of the graft copolymer is dried using a fluid bed dryer (Full Capacity: 10 L, External Size (W×D×H, mm): 1400×750×1400, Manufacturer: Canatech Co., Ltd) at 95° C. for 120 minutes.

5. Step of Adding poly(oxyalkylene)diglycolic Acid

Subsequently, poly(oxyalkylene)diglycolic acid is added to the wet powder of the graft copolymer.

A coating layer may be formed on a surface of the wet powder of the graft copolymer by adding the poly(oxyalkylene)diglycolic acid, and therefore, the binding and deformation of the wet powder of the graft copolymer may be prevented, thereby preventing or minimizing caking.

The poly(oxyalkylene)diglycolic acid may have a weight average molecular weight of 1,000 to 10,000 g/mol, 1,500 to 8,000 g/mol or 2,000 to 6,000 g/mol, and preferably, 2,000 to 6,000 g/mol. When the above-mentioned range is satisfied, dispersion is easy, and coating efficiency is superior.

The weight average molecular weight may be measured through gel permeation chromatography using tetrahydrofuran as an eluent as a relative value for a standard polystyrene (PS) sample.

The poly(oxyalkylene)diglycolic acid may be poly(oxyethylene)diglycolic acid.

The poly(oxyalkylene)diglycolic acid may be included at 0.1 to 5 parts by weight, 0.3 to 3 parts by weight or 0.5 to 2 parts by weight, and preferably, 0.5 to 2 parts by weight, with respect to 100 parts by weight of the wet powder of the graft copolymer. When the above-mentioned range is satisfied, caking of the wet powder of the graft copolymer may be minimized, and physical properties of the graft copolymer may not be affected.

The poly(oxyalkylene)diglycolic acid satisfying the above-described content may be added while being mixed with water to be mixed with the wet powder of the graft copolymer.

The poly(oxyalkylene)diglycolic acid and water may be mixed at a weight ratio of 80:20 to 50:50, 75:25 to 50:50 or 70:30 to 50:50, and preferably, 70:30 to 50:50. When the above-mentioned range is satisfied, the poly(oxyalkylene)diglycolic acid may be more easily mixed and coated with the wet powder of the graft copolymer.

The method for preparing a graft copolymer powder according to an exemplary embodiment of the present invention may further include a drying step after poly(oxyalkylene)diglycolic acid is added.

The drying step may be carried out at 50 to 100° C., 55 to 95° C. or 60 to 90° C., and preferably 60 to 90° C. When the above-mentioned range is satisfied, caking of the dry powder of the graft copolymer may be minimized.

The drying step may be carried out for 90 to 240 minutes, 100 to 180 minutes or 120 to 150 minutes, and preferably 120 to 150 minutes. When the above-mentioned range is satisfied, caking of the dry powder of the graft copolymer may be minimized by sufficiently drying the wet powder of the graft copolymer.

A graft copolymer powder according to another exemplary embodiment of the present invention may include a graft copolymer formed through emulsion polymerization of a conjugated diene polymer, an aromatic vinyl monomer and an alkyl (meth)acrylate monomer and a poly(oxyalkylene)diglycolic acid-derived unit. Specifically, the poly(oxyalkylene)diglycolic acid-derived unit may be disposed on the graft copolymer powder in the form of a film.

The graft copolymer powder may have a disintegration rate of 70% or more, and preferably 90% or more.

Here, the disintegration rate may be calculated by preparing a powder cake by adding 20 g of the graft copolymer powder into a cylinder-type mold with an inner diameter of 50 mm and a height of 60 mm, loading a weight of 20 kg and storing the powder at 60° C. for 20 minutes, mounting the powder cake on a sieve having a size of 2 mm and a line width of 0.9 mm, vibrating the powder cake with an amplitude of 0.5 mm at intervals of 2 minutes, measuring a weight of remaining powder every hour, and converting the weight of the powder passing through the sieve relative to the weight of the added graft copolymer powder into a percentage.

EXAMPLES

Hereinafter, embodiments of the present invention will be described in detail with reference to the accompanying drawings so that those of ordinary skill in the art can easily carry out the present invention. However, the present invention may be implemented in a variety of different forms, and is not limited to the embodiments described herein.

Example 1

Emulsion polymerization was performed by continuously adding 55 parts by weight (solid content) of a butadiene polymer latex which has an average particle diameter of 300 nm and a refractive index of 1.516, 11 parts by weight of styrene, 31.5 parts by weight of methyl methacrylate, 2.5 parts by weight of acrylonitrile, 100 parts by weight of ion-exchange water, 0.7 part by weight sodium dodecyl benzene sulfonate as an emulsifier, 0.04 part by weight of cumene hydroperoxide as an initiator, 0.048 part by weight of sodium formaldehyde sulfoxylate as an activator, 0.012 part by weight of sodium ethylenediamine tetraacetate as an activator, 0.001 part by weight of ferrous sulfate as an activator, and 0.45 part by weight of t-dodecyl mercaptan as a molecular weight modifier to a reactor set to 75° C. for 5 hours. A temperature of the reactor was raised to 80° C. to allow aging for 1 hour, and then the reaction was terminated, thereby preparing a graft copolymer latex.

Subsequently, with respect to 100 parts by weight of the graft copolymer latex, coagulation was carried out by adding 200 parts by weight of water and 6 parts by weight of calcium chloride to a coagulation vessel, and continuously adding 100 parts by weight of the graft copolymer latex at 90° C.

The coagulated graft copolymer was aged at 50° C. for 25 minutes, washed, and dehydrated using a centrifugal dehydrator (trade name: WS-7000, manufacturer: Hanil Electronics) at room temperature for 5 minutes, thereby preparing a wet powder of the graft copolymer.

With respect to 100 parts by weight of the wet powder of the graft copolymer, 1 part by weight of an aqueous solution of poly(oxyethylene)diglycolic acid (trade name: poly(oxyethylene)diglycolic acid 3000 (carboxymethylated PEG), manufacturer: Wako Chemical Ind. Ltd., concentration: 70 wt %) was added and mixed evenly, thereby preparing a graft copolymer powder.

Example 2

The coagulated graft copolymer of Example 1 was aged at 90° C. for 25 minutes, washed and dehydrated using a centrifugal dehydrator (trade name: WS-7000, manufacturer: Hanil Electronics) at room temperature for 5 minutes, thereby preparing a wet powder of the graft copolymer.

With respect to 100 parts by weight of the wet powder of the graft copolymer, 1 part by weight of an aqueous solution of poly(oxyethylene)diglycolic acid (trade name: poly(oxyethylene)diglycolic acid 3000 (carboxymethylated PEG), manufacturer: Wako Chemical Ind. Ltd., concentration: 70 wt %) was added and mixed evenly, thereby preparing a graft copolymer powder.

Comparative Example 1

The wet powder of the graft copolymer of Example 1 was used as a graft copolymer powder.

Comparative Example 2

The wet powder of the graft copolymer of Example 2 was used as a graft copolymer powder.

Comparative Example 3

A wet powder of the graft copolymer, which was prepared by washing the coagulated graft copolymer of Example 1 without aging, and dehydrating the washed graft copolymer using a centrifugal dehydrator (trade name: WS-7000, manufacturer: Hanil Electronics) for 5 minutes, was used as a graft copolymer powder.

Experimental Example 1

A powder cake was prepared by adding 20 g of the graft copolymer powder of the Example or Comparative Example to a cylinder-shaped mold with an inner diameter of 50 mm and a height of 60 mm, loading a weight of 20 kg and storing the cake at 60° C. for 20 minutes.

The powder cake was mounted on a sieve having a size of 2 mm and a line width of 0.9 mm, and vibrated with an amplitude of 0.5 mm at intervals of 2 minutes. A weight of the remaining powder was measured every hour, and thereby a weight of the graft copolymer powder passing through the sieve relative to the weight of the added graft copolymer powder was converted into a percentage. In addition, the percentage was defined as a disintegration rate, and the result is listed in Table 1 below. Here, when the disintegration rate was 70% or more, it was assumed that the disintegration of the powder cake completely occurred, and thus the experiment was stopped.

TABLE 1

| Classification | | Example 1 | Example 2 | Comparative Example 1 | Comparative Example 2 | Comparative Example 3 |
|---|---|---|---|---|---|---|
| Disintegration rate | 2 min | 70.0% | 92.1% | 38.0% | 45.0% | 29.3% |
| | 4 min | — | — | 51.4% | 72.0% | 57.6% |
| | 6 min | — | — | 61.0% | 82.5% | 72.4% |
| | 8 min | — | — | 69.1% | — | — |
| | 10 min | — | — | 74.9% | — | — |

Referring to Table 1, in Examples 1 and 2, since the disintegration rate was 70% or more even when performing sieving once, it was confirmed that caking was minimized. Particularly, in Example 2, due to the high aging temperature, the disintegration rate was raised to 92.1%, confirming that caking hardly occurred.

On the other hand, in Comparative Examples 1 to 3, when sieving was performed once, since the disintegration rate was 45% or less, it was confirmed that the powder cake was not broken up into a fine powder so as to pass through the sieve, but broken up into a fine powder through sieving two or more times. Particularly, in Comparative Example 3, an aging process was not performed, and an aqueous solution of poly(oxyethylene)diglycolic acid was not added, and therefore it can be confirmed that caking severely occurred.

From the above-described results, according to an example of the present invention, it can be inferred that a graft copolymer powder having an excellent anti-caking property was prepared.

The invention claimed is:

1. A method for preparing a graft copolymer powder, comprising:
    performing emulsion polymerization of a conjugated diene polymer, an aromatic vinyl monomer and an alkyl (meth)acrylate monomer to prepare a graft copolymer latex;
    coagulating the graft copolymer latex;
    aging the coagulated graft copolymer;
    dehydrating the aged graft copolymer to prepare a wet powder of the graft copolymer; and
    adding poly(oxyalkylene)diglycolic acid to the wet powder of the graft copolymer.

2. The method of claim 1, wherein the poly(oxyalkylene)diglycolic acid is poly(oxyethylene)diglycolic acid.

3. The method of claim 1, wherein the poly(oxyalkylene)diglycolic acid is added at 0.1 to 5 parts by weight with respect to 100 parts by weight of the wet powder of the graft copolymer.

4. The method of claim 1, wherein the poly(oxyalkylene)diglycolic acid is added while in a state of being mixed with water.

5. The method of claim 1, wherein the wet powder of the graft copolymer has a moisture content of 10 to 40%.

6. The method of claim 1, wherein the aging is performed at 50 to 98° C.

7. The method of claim 1, wherein the aging is performed for 20 to 100 minutes.

8. The method of claim 1, wherein the preparing of the graft copolymer latex is preparing a graft copolymer latex through emulsion polymerization by further adding a vinyl-cyano monomer.

9. The method of claim 1, further comprising drying following the addition of the poly(oxyalkylene)diglycolic acid.

10. The method of claim 9, wherein the drying is performed at 50 to 100° C.

11. A graft copolymer powder comprising:
    a graft copolymer formed by emulsion polymerization of a conjugated diene polymer, an aromatic vinyl monomer and an alkyl (meth)acrylate monomer; and
    a poly(oxyalkylene)diglycolic acid-derived unit.

12. The graft copolymer powder of claim 11, wherein a cake of the powder has a disintegration rate of 70% or more when vibrated for two minutes.

* * * * *